United States Patent
Krishnamurthy et al.

(10) Patent No.: US 10,176,248 B2
(45) Date of Patent: Jan. 8, 2019

(54) PERFORMING A DYNAMIC SEARCH OF ELECTRONICALLY STORED RECORDS BASED ON A SEARCH TERM FORMAT

(71) Applicant: International Business Machines Corporation, Armonk, NY (US)

(72) Inventors: Ram Krishnamurthy, Westford, MA (US); Susan K. McKinstry, Tucson, AZ (US); Anders Swenson, Pepperell, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 322 days.

(21) Appl. No.: 13/964,467

(22) Filed: Aug. 12, 2013

(65) Prior Publication Data

US 2015/0046432 A1 Feb. 12, 2015

(51) Int. Cl.
*G06F 17/30* (2006.01)
*G06Q 10/10* (2012.01)

(52) U.S. Cl.
CPC .. *G06F 17/30634* (2013.01); *G06F 17/30864* (2013.01); *G06Q 10/107* (2013.01)

(58) Field of Classification Search
None
See application file for complete search history.

(56) References Cited

U.S. PATENT DOCUMENTS

| | | | |
|---|---|---|---|
| 7,596,555 B2 | 9/2009 | Klein | |
| 7,802,191 B2 | 9/2010 | Pettinati et al. | |
| 7,958,197 B2 | 6/2011 | Hughes et al. | |
| 8,019,741 B2* | 9/2011 | Gross et al. | 707/705 |
| 8,103,661 B2 | 1/2012 | Maguire | |
| 8,112,437 B1 | 2/2012 | Katragadda et al. | |
| 8,244,811 B1 | 8/2012 | Dowd et al. | |
| 8,370,349 B2 | 2/2013 | Quoc et al. | |
| 8,538,989 B1* | 9/2013 | Datar et al. | 707/780 |
| 2007/0088788 A1* | 4/2007 | Goldberg | G06Q 10/107 709/206 |
| 2007/0198474 A1 | 8/2007 | Davidson et al. | |
| 2008/0250114 A1* | 10/2008 | Dubovsky | G06Q 10/107 709/206 |
| 2009/0276412 A1* | 11/2009 | Anderson | G06Q 30/02 |
| 2012/0089641 A1* | 4/2012 | Wilde et al. | 707/771 |
| 2012/0124059 A1* | 5/2012 | Pratt | G06Q 10/107 707/748 |
| 2013/0086177 A1* | 4/2013 | Becker, IV | G06Q 10/107 709/206 |
| 2013/0166598 A1* | 6/2013 | Vaitheeswaran | G06F 17/30566 707/792 |

\* cited by examiner

*Primary Examiner* — Christopher J Raab
(74) *Attorney, Agent, or Firm* — Cuenot, Forsythe & Kim, LLC

(57) ABSTRACT

Arrangements described herein related to performing a dynamic search. A search term can be received and a format of the search term can be identified. Based on the identified format of the search term, a field of a plurality of records can be selected to search, the field having a format matching the identified format of the search term. The field can be searched to identify at least a first of the plurality of records that at least partially matches the search term. At least a portion of at least the first of the plurality of records that at least partially matches the search term can be presented to a user.

15 Claims, 4 Drawing Sheets

PERFORMING A DYNAMIC SEARCH OF ELECTRONICALLY STORED RECORDS BASED ON A SEARCH TERM FORMAT

BACKGROUND

The embodiments disclosed within this specification relate to searching of electronically stored records.

The use of computers to store any variety of information is commonplace. For example, computers frequently are used to store electronic mail (e-mail) and contact information for people with whom e-mails are exchanged. In this regard, e-mail clients typically are used to generate and send outgoing emails, and to receive and view incoming e-mails. E-mail clients may be resident on a local processing system, such as a computer, smart phone, or the like, or resident on a server accessed by a processing system. Moreover, e-mail clients may be implemented as modules within applications that, in addition to processing and/or storing e-mails, perform other functions.

SUMMARY

One or more embodiments disclosed within this specification relate to performing a dynamic search and, more particularly, to performing a dynamic search of electronically stored records based on a search term format.

An embodiment can include a method for performing a dynamic search. The method can include receiving a search term and identifying a format of the search term. The method also can include, based on the identified format of the search term, selecting a first field of a plurality of records to search, the first field having a format matching the identified format of the search term. The method further can include searching, using a processor, the first field to identify at least a first of the plurality of records that at least partially matches the search term. At least a portion of at least the first of the plurality of records that at least partially matches the search term can be presented to a user.

Another embodiment can include a system having a processor. The processor can be configured to initiate executable operations including receiving a search term and identifying a format of the search term. The executable operations also can include, based on the identified format of the search term, selecting a first field of a plurality of records to search, the first field having a format matching the identified format of the search term. The executable operations further can include searching, using a processor, the first field to identify at least a first of the plurality of records that at least partially matches the search term. At least a portion of at least the first of the plurality of records that at least partially matches the search term can be presented to a user.

Another embodiment can include a computer program product for performing a dynamic search. The computer program product can include a computer-readable storage medium having stored thereon program code that, when executed, configures a processor to perform a method including receiving a search term and identifying a format of the search term. The method also can include, based on the identified format of the search term, selecting a first field of a plurality of records to search, the first field having a format matching the identified format of the search term. The method further can include searching, using a processor, the first field to identify at least a first of the plurality of records that at least partially matches the search term. At least a portion of at least the first of the plurality of records that at least partially matches the search term can be presented to a user.

DETAILED DESCRIPTION

Figure 1:
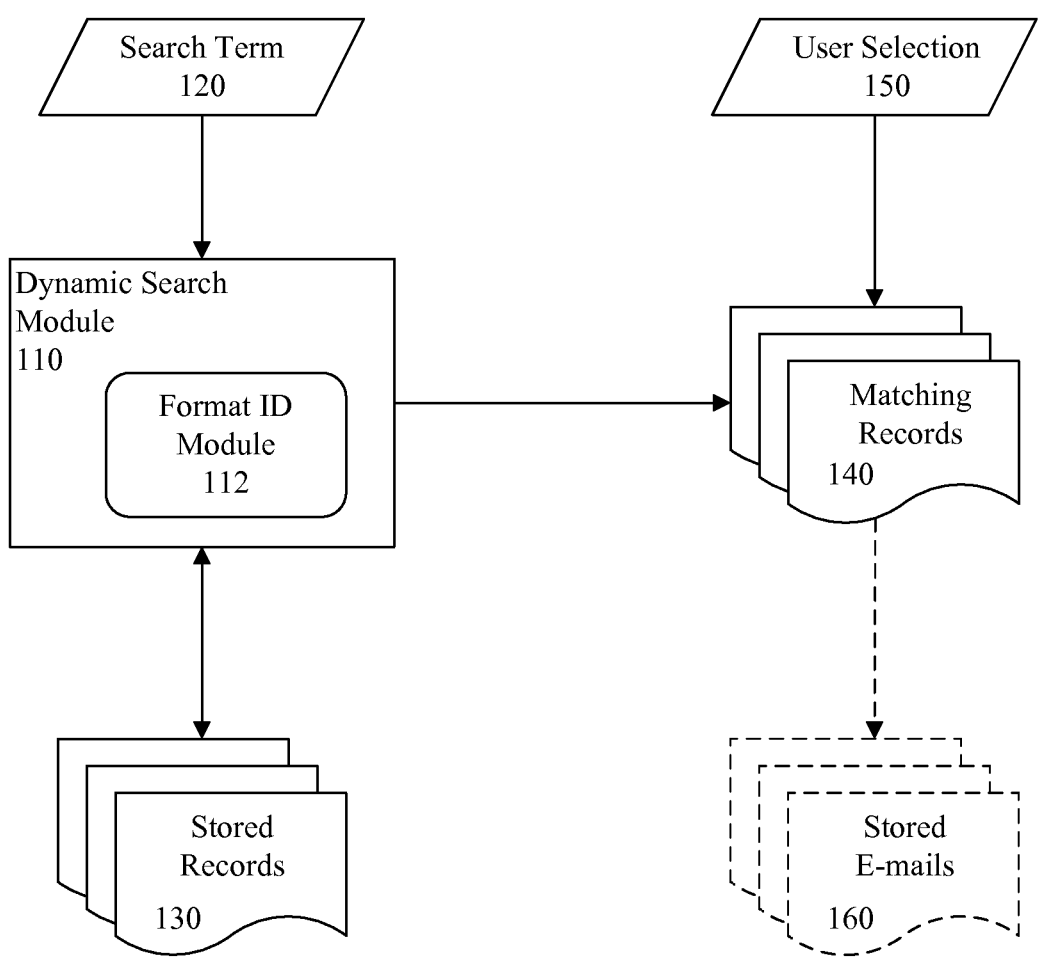
FIG. 1 is a block diagram illustrating a system for performing a dynamic search in accordance with an embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. As defined herein, the term "computer-readable storage medium" means a tangible storage medium that contains or stores program code for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to performing a dynamic search of electronically stored records. More particularly, a search term can be received and the format of the search term can be identified. Based on the format of the search term, one or more fields of the electronic records having a format matching the format of the search term can be identified, and at least one of these fields can be selected to be searched in the electronic records. Electronic records containing information in the searched field that at least partially match the search term can be identified and at least a portion of the electronic records can be presented to a user.

Several definitions that apply throughout this document will now be presented.

As used herein, the term "user" means a person (i.e., human being), for example a person using a device and/or system described herein.

As used herein, the term "search term" means one or more characters entered by a user, via a user interface, to perform a search of data stored electronically. A search term may include one or more alphanumeric characters (i.e., a-z, A-Z, and/or 0-9) and/or one or more characters that are non-alphanumeric characters (e.g., ".", ",", "-", "!", "*", "$", "£", "%", "&", "<", ">", "^", "(", ")", one or more spaces between alphanumeric and/or other non-alphanumeric characters, etc.). A search term can be entered by a user to a processing system via a suitable input device.

As used herein, the term "format" means a manner in which alphanumeric characters and/or non-alphanumeric characters are organized. In illustration, if a search term includes both alphanumeric characters and non-alphanumeric characters, the format of the search term can be indicated by the relationship of the alphanumeric characters to the non-alphanumeric characters. For example, if a search term includes a plurality of letters followed by a comma and another plurality of letters, the format of the search term can be identified as being a name with last name first followed by a given name. If a search term includes a plurality of letters followed by a space and then another plurality of letters, the format of the search term can be identified as being a name with a given name followed by last name and/or identified as being a first word followed by a second word in a phrase. If a search term includes three numerals, sequentially followed by a hyphen, two numerals, another hyphen, and three numerals, the format of the search term can be identified as being a social security number. Still, the format of a search term can be identified in any other suitable manner and the present arrangements are not limited in this regard.

As used herein, the term "field" means a particular portion of a set of data. In illustration, a data table can include, for each of a plurality of records, a plurality of fields (i.e., columns). Each field can store a particular type of data. An e-mail also can include a plurality of fields, each of which store a particular type of data (e.g., a sender identifier, a recipient identifier, data pertaining to the subject of the e-mail, data for the body of the e-mail, etc.).

As used herein, the term "record" means a group of fields of an electronic data structure. In one example, a record can be a record in a database table, hash table or the like which comprises a plurality of fields. In another example, a record can be a group of electronic data in an electronic message (e.g., e-mail, text message, etc.) which comprises a plurality of fields.

FIG. 1 is a block diagram illustrating a system 100 for performing a dynamic search in accordance with one embodiment disclosed within this specification. The system 100 can include a dynamic search module 110. The dynamic search module 110 can be a component of an application executed by a processing system or a stand-alone application. The dynamic search module 110 can be configured to receive a search term 120, which can be, for example, input by a user of the processing system using a suitable input device, such as a keyboard, touch screen, pointing device, or the like.

The dynamic search module 110 can include a format identification module 112 which processes the search term 120 to identify a format of the search term 120. In illustration, the format identification module 112 can parse the search term 120 to identify alphanumeric characters and/or non-alphanumeric characters contained in the search term 120, as well as positional relationships between alphanumeric characters and/or non-alphanumeric characters. Based on these characters and their positional relationships, the format identification module 112 can determine the format of the search term 120.

Based on the identified format of the search term, the dynamic search module 110 can identify one or more stored records 130 comprising one or more fields having the same format as the search term 120, and select at least one of such fields to be searched in the stored records 130 to find at least partial matches to the search term 120. In one example, each of the stored records 130 can be a contact record for a particular person, and can include a field for a given name (i.e., first name), a field for a last name, one or more fields for associated e-mail addresses, etc. The dynamic search module 110 can identify one or more of such fields having a format corresponding to the format of the search term 120. In another example, each of the stored records 130 can be an e-mail, and can include a field for a sender of the e-mail, a field for one or more recipients of the e-mail, a field for one or more contacts carbon copied on the e-mail, a field for a subject of the e-mail, a field for a body of the e-mail, a field that identifies one or more attachments to the e-mail, etc. Again, the dynamic search module 110 can identify one or more of such fields having a format corresponding to the format of the search term 120.

In the case that two or more fields are identified that have the format matching the format of the search term 120, an arbitration process can be performed to determine which field has higher relevance to the search term. For instance, based on the search term, the dynamic search module 110 can assign a value to each field, and determine which field has the highest value. The field having the highest assigned value can be selected as the field to be searched for a match to the search term 120. The fields can be weighted, for example, based on how recently and/or how frequently e-mails have been received from contacts associated with the respective fields. In illustration, weights can be equally divided among how recently e-mails have been received and how frequently e-mails have been received, and the values assigned to the respective fields can be derived from such weights.

The dynamic search module 110 can search the selected field of the stored records 130 to identify one or more records in which the searched field at least partially matches the search term, and output such records as matching records 140. At least a portion of each of the matching records can be presented to a user, for example via a display communicatively linked to the processing system. For example, the information contained in the matching records 140 for the field that was searched can be presented. From the presented information, the user can select a desired match to the search term 120 and the corresponding record can be presented.

In one example, if the matching records 140 are e-mails, and the field(s) that was/were searched is/are a sender, recipient and/or carbon copy field, the user can select from the matching records 140, via a user selection 150, the information for one such record having a name in at least one of the fields at least partially matching the search term 120. In response, the selected e-mail can be presented to the user. In one arrangement, the e-mails that are presented as the matching records 140 can be limited to e-mails that satisfy a particular time criteria for when the e-mails were sent and/or received, or when a contact associated with the e-mails was added to a contact list. For example, the matching records can be limited to e-mails sent and/or received within the last day, week, month, year, etc.

In another example, if the matching records 140 are contact records containing contact information for respective contacts, the user can select from the matching records 140, via the user selection 150, the information for one such record having a name in at least one of the fields at least partially matching the search term 120. In response, the dynamic search module 110 can identify stored e-mails 160 that include the contact indicated in the contact record as being a sender of the e-mails, a recipient of the e-mails and/or copied on the e-mails, and present such e-mails to the user. From the presented e-mails, the user can enter another user selection (not shown) to select at least one of the e-mails to be presented. Again, the e-mails that are presented as the matching records 140 can be limited to e-mails that satisfy a particular time criteria for when the e-mails were sent and/or received, or when a contact associated with the e-mails was added to a contact list.

In one arrangement, the user can override the selected field to be searched in the stored records 130. For example, if a particular user field is selected in which the search is to be performed, or has been performed, a menu, pop-up window or the like can be presented to the user indicating one or more other fields the user may select to be searched. A user input selecting at least one of the other fields can be received, and the user selected other field can be searched to identify from the stored records 130 the portion of the stored records 130 that at least partially match the search term 120. The identified records can be presented to the user as the matching records 140.

Notably, the search process performed by the dynamic search module 110 can be continually updated as the user continues to enter alphanumeric and/or non-alphanumeric characters for the search term 120. In illustration, each time a new character for the search term 120 is entered by the user, the format identification module 112 can update the identification of the search term format, and the dynamic search module 110 can update the list of matching records 140 presented to the user as the new characters are received. In this regard, information from the matching records 140 can be presented to the user as a type-ahead list that is able to handle partial name matches along with abbreviated, alternate, first name and/or last name spelling based on information contained in the user's contact list, which may be stored locally or on a server. Further, the information presented to the user can include names available in the selected field.

Figure 2A:
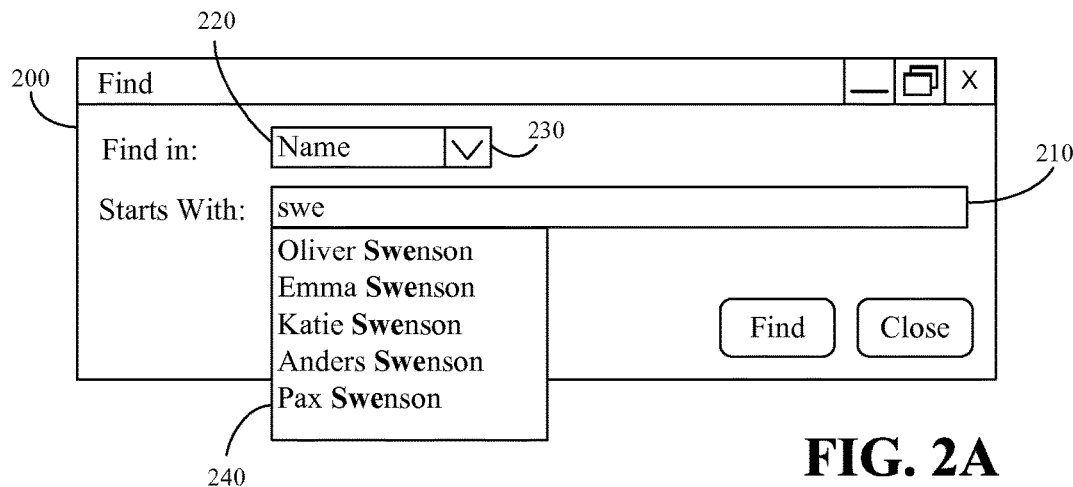
FIGS. 2A-2C depict a view of a search dialog window in accordance with an embodiment disclosed within this specification.
Figure 2B:
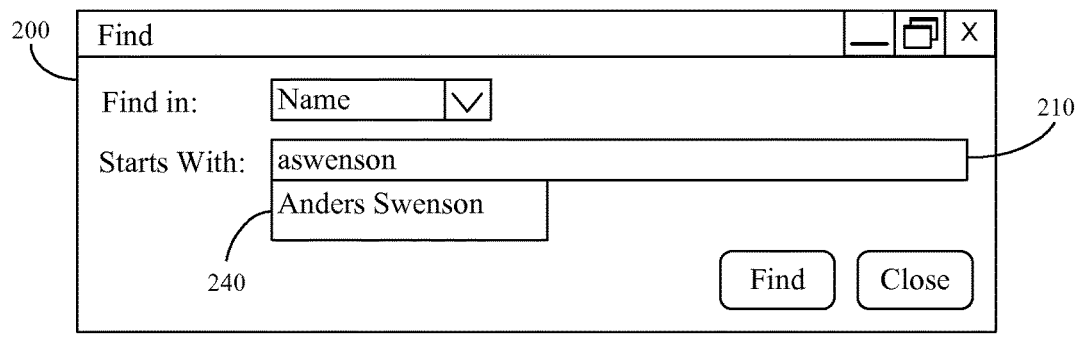
Figure 2C:
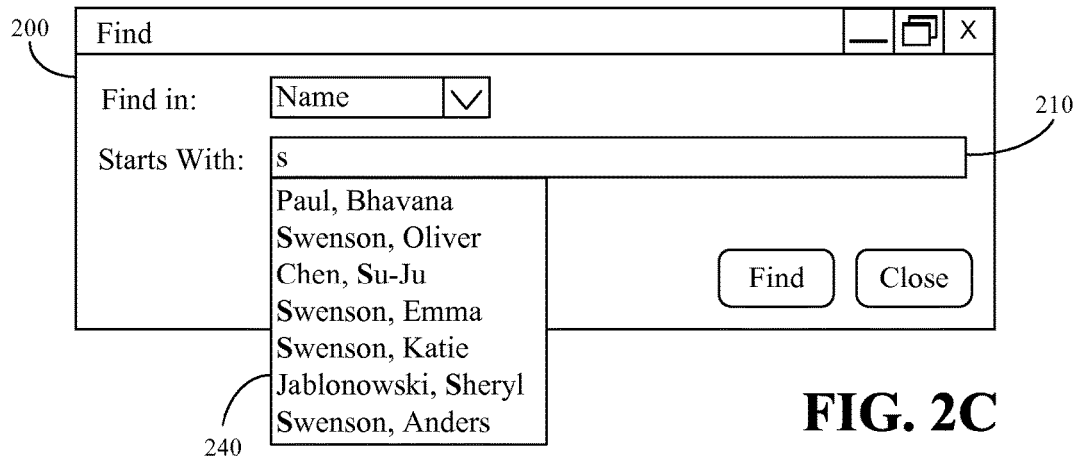

FIGS. 2A-2C depict a view of a search dialog window 200 in accordance with an embodiment disclosed within this specification. Referring to FIG. 2A, the search dialog window 200 can include a search term input box 210 configured to receive from a user alphanumeric and/or non-alphanumeric characters for a search term. The search dialog window 200 also can include a field indication box 220 configured to present an identifier for a field in the stored records being searched. Based on the format of the search term entered by the user, the field in the stored records being searched can be automatically selected. Moreover, the field can be updated by the dynamic search module as the search term characters are entered based on the arbitration method discussed herein. Further, the user can override the automatic selection of the field. For example, the user can select a control button 230 or the like of the field indication box 220 to present a menu of fields, and the user can select a desired field from the menu.

A menu 240 of potential matches to the search term also can be presented. In illustration, the menu 240 can present information from one or more fields of records (i.e., at least of portion of the records) in which the selected field indicated in the field indication box 220 at least partially matches the search term entered into the search term input box 210. As the user enters the characters into the search term input box 210, the menu 240 can be dynamically updated by the dynamic search module. In illustration, if the user enters "swe", records that have the characters "swe" in the given name and/or last name field can be presented in the menu 240. Even though the characters "swe" may only match a given name or a last name, both the given name and last name can be presented. From the menu 240, the user can select a desired contact record. A list of e-mails sent to, received by and/or copied to the contact identified in the contact record can be presented to the user. Such e-mails can be presented chronologically or in any other suitable manner.

Referring to FIG. 2A, the user may enter the characters "aswenson" into the search term input box 210 as a search term. The format identification module 112 can parse the search term "aswenson" to identify the term initial "a" and the last name "Swenson", and the dynamic search module can identify a contact record in which the contact has a given name beginning with the letter "a" and a last name that at least partially matches the characters "swenson". Such contact record (e.g., at least a portion of the contact record) can be presented in the menu 240, from which the user can select the contact record. Again, a list of e-mails sent to, received by and/or copied to the contact identified in the contact record can be presented to the user.

Referring to FIG. 2C, the user may enter the character "s" into the search term input box 210 as a search term. The dynamic search module can identify a contact records in which the contacts have a given name or last name that includes the letter "s", or the letter "s" is otherwise associated with the contact record. Such contact records (e.g., at least a portion of each contact record) can be presented in the menu 240, from which the user can select the desired contact record. Again, a list of e-mails sent to, received by and/or copied to the contact identified in the contact record can be presented to the user.

Figure 3:
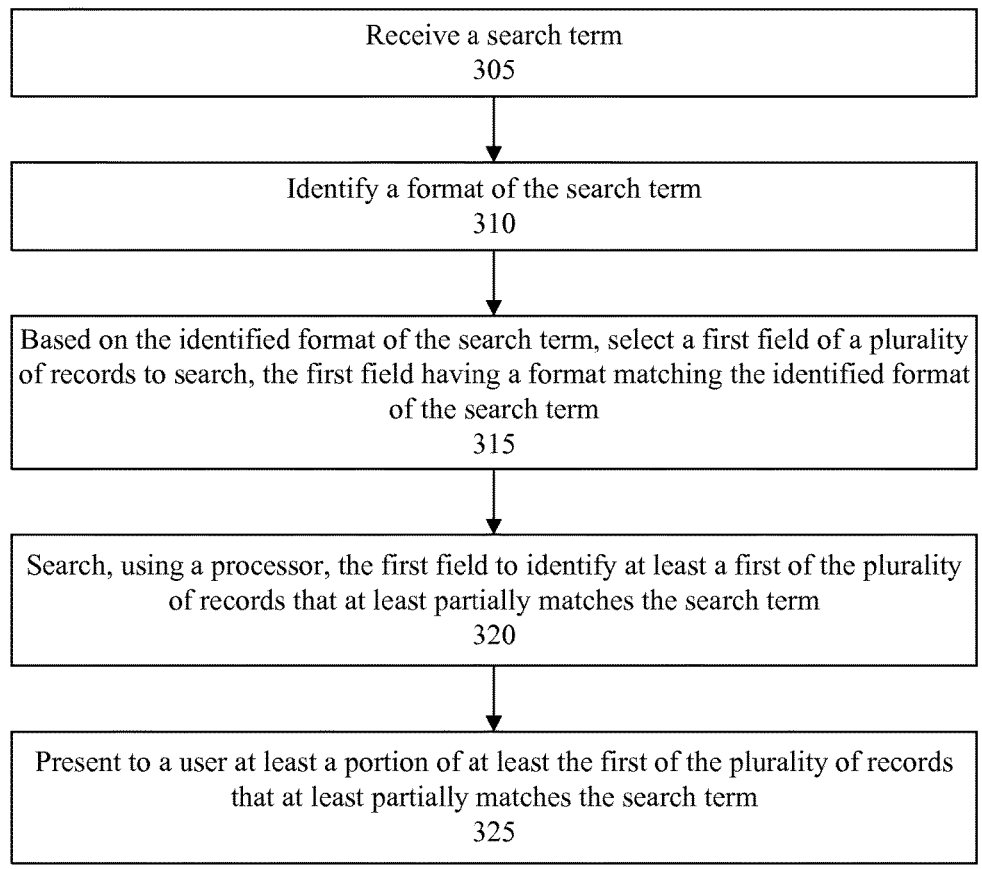
FIG. 3 is a flow chart illustrating a method of performing a dynamic search in accordance with an embodiment disclosed within this specification.

FIG. 3 is a flow chart illustrating a method 300 of performing a dynamic search in accordance with an embodiment disclosed within this specification. At step 305, a search term can be received. In illustration, the search term can be entered by a user via an input device, such as a keyboard, touch screen, pointing device, or the like. At step 310, a format of the search term can be identified. At step 315, based on the identified format of the search term, a first field of a plurality of records to search can be selected. The first field can have a format matching the identified format of the search term. At step 320, the first field can be searched, using a processor, to identify at least a first of the plurality of records that at least partially matches the search term. At step 325, at least a portion of at least the first of the plurality of records that at least partially matches the search term can be presented to a user, for example via a display.

Figure 4:
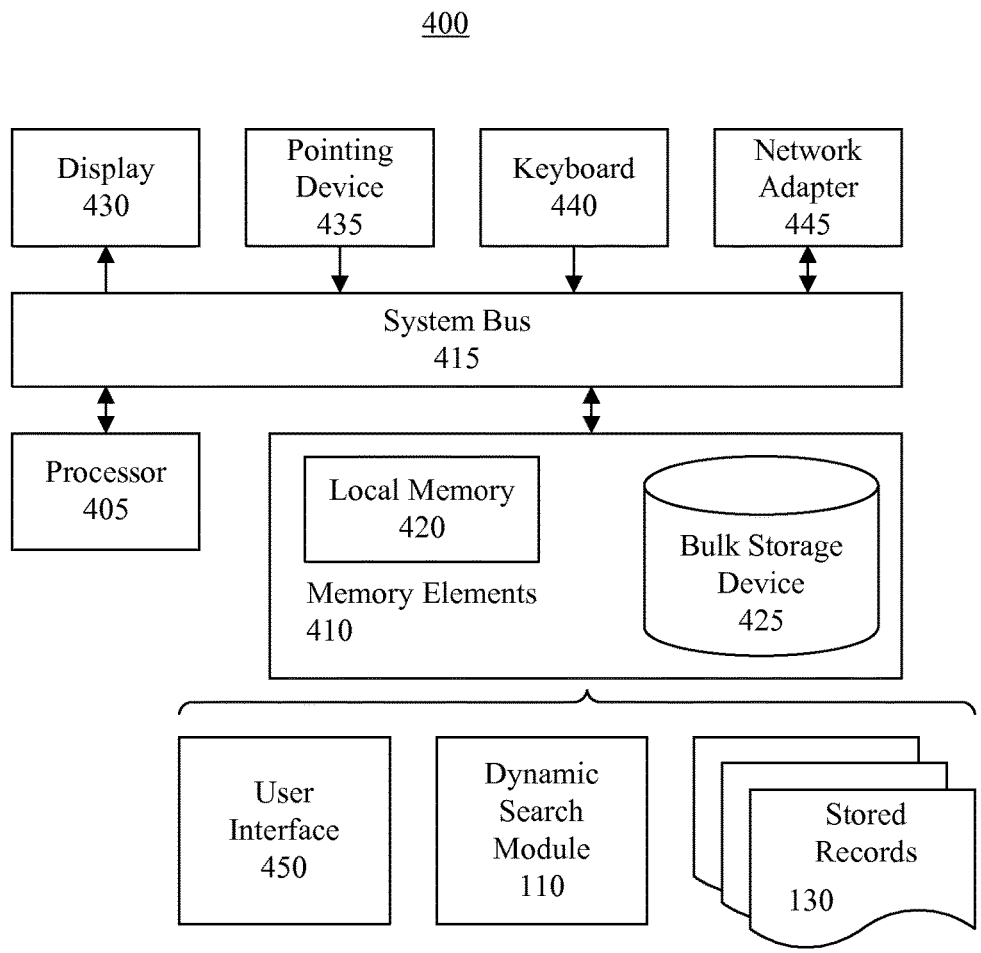
FIG. 4 is a block diagram of a processing system for performing a dynamic search in accordance with an embodiment disclosed within this specification.

FIG. 4 is a block diagram of a processing system 400 for performing a dynamic search in accordance with an embodiment disclosed within this specification. The processing system 400 can include at least one processor 405 (e.g., a central processing unit) coupled to memory elements 410 through a system bus 415 or other suitable circuitry. As such, the processing system 400 can store program code within the memory elements 410. The processor 405 can execute the program code accessed from the memory elements 410 via the system bus 415. It should be appreciated that the processing system 400 can be implemented in the form of any system including a processor and memory that is capable of performing the functions and/or operations described within this specification. For example, the processing system 400 can be implemented as a computer, a workstation, a mobile computer, a laptop computer, tablet computer, a smart phone, a personal digital assistant, an appliance, and so on.

The memory elements 410 can include one or more physical memory devices such as, for example, local memory 420 and one or more bulk storage devices 425. Local memory 420 refers to RAM or other non-persistent memory device(s) generally used during actual execution of the program code. The bulk storage device(s) 425 can be implemented as a hard disk drive (HDD), solid state drive (SSD), or other persistent data storage device. The processing system 400 also can include one or more cache memories (not shown) that provide temporary storage of at least some program code in order to reduce the number of times program code must be retrieved from the bulk storage device 425 during execution.

Input/output (I/O) devices such as a display 430, a pointing device 435 and, optionally, a keyboard 440 can be coupled to the processing system 400. The I/O devices can be coupled to the processing system 400 either directly or through intervening I/O controllers. For example, the display 430 can be coupled to the processing system 400 via a graphics processing unit (GPU), which may be a component of the processor 405 or a discrete device. One or more network adapters 445 also can be coupled to processing system 400 to enable processing system 400 to become coupled to other systems, computer systems, remote printers, and/or remote storage devices through intervening private or public networks. Modems, cable modems, transceivers, and Ethernet cards are examples of different types of network adapters 445 that can be used with processing system 400.

As pictured in FIG. 4, the memory elements 410 can store the components of the system 100 of FIG. 1, namely the dynamic search module 110 and the stored records 130. The memory elements 410 also can store a user interface 450 configured to receive user inputs, for example characters for a search term and user selections of one or more fields and/or records. The user interface can be a component of an e-mail client, a web browser, or another application. Being implemented in the form of executable program code, these components 110, 130, 450 can be executed by the processing system 400 and, as such, can be considered part of the processing system 400. Moreover, the dynamic search module 110, stored records 130 and user interface 450 are functional data structures that impart functionality when employed as part of the processing system 400 of FIG. 4.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of performing a dynamic search, the method comprising:
   receiving a search term;
   identifying a format of the search term;
   based on the identified format of the search term, identifying, in each of a plurality of contact records, a first field and at least a second field, each of the first field and the second field having a respective format matching the identified format of the search term;
   performing an arbitration process to determine that the first field has higher relevance to the search term than the second field, performing the arbitration process comprising weighting the first field and the second field based on how recently or how frequently electronic messages have been received from contacts associated with the respective fields, assigning to the first field a first value derived from the weighting, and assigning to the second field a second value derived from the weighting;
   responsive to determining that the first field has higher relevance to the search term than the second field, searching, using a processor, the first field to identify at least a first of the plurality of contact records that at least partially matches the search term;
   presenting to a user at least a portion of at least the first of the plurality of contact records that at least partially matches the search term; and
   responsive to receiving a user input selecting the first of the plurality of contact records that at least partially matches the search term, identifying at least one e-mail for which the first field and at least the second field at least partially match data in the e-mail.

2. The method of claim 1, wherein identifying the format of the search term comprises parsing the search term to identify the format.

3. The method of claim 1, wherein determining that the first field has higher relevance to the search term than the second field comprises:
   determining that the first value is greater than the second value.

4. The method of claim 1, further comprising:
   receiving a user input selecting a second field of the plurality of records to search;
   searching the second field to identify at least a second of the plurality of records that at least partially matches the search term; and
   presenting to the user at least a portion of at least the second of the plurality of records that at least partially matches the search term.

5. The method of claim 1, wherein identifying the at least one e-mail corresponding to the first of the plurality of records comprises:
   determining the at least one e-mail satisfies a particular time criteria for when the e-mail was sent or received.

6. A system comprising:
a processor programmed to initiate executable operations comprising:
receiving a search term;
identifying a format of the search term;
based on the identified format of the search term, identifying, in each of a plurality of contact records, a first field and at least a second field, each of the first field and the second field having a respective format matching the identified format of the search term;
performing an arbitration process to determine that the first field has higher relevance to the search term than the second field, performing the arbitration process comprising weighting the first field and the second field based on how recently or how frequently electronic messages have been received from contacts associated with the respective fields, assigning to the first field a first value derived from the weighting, and assigning to the second field a second value derived from the weighting;
responsive to determining that the first field has higher relevance to the search term than the second field, searching the first field to identify at least a first of the plurality of contact records that at least partially matches the search term;
presenting to a user at least a portion of at least the first of the plurality of contact records that at least partially matches the search term; and
responsive to receiving a user input selecting the first of the plurality of contact records that at least partially matches the search term, identifying at least one e-mail for which the first field and at least the second field at least partially match data in the e-mail.

7. The system of claim 6, wherein identifying the format of the search term comprises parsing the search term to identify the format.

8. The system of claim 6, wherein determining that the first field has higher relevance to the search term than the second field comprises:
determining that the first value is greater than the second value.

9. The system of claim 6, the executable operations further comprising:
receiving a user input selecting a second field of the plurality of records to search;
searching the second field to identify at least a second of the plurality of records that at least partially matches the search term; and
presenting to the user at least a portion of at least the second of the plurality of records that at least partially matches the search term.

10. The system of claim 6, wherein identifying the at least one e-mail corresponding to the first of the plurality of records comprises:
determining the at least one e-mail satisfies a particular time criteria for when the e-mail was sent or received.

11. A computer program product for performing a dynamic search, the computer program product comprising a computer readable storage device, wherein the computer-readable storage device is not a transitory, propagating signal per se, having program code stored thereon, the program code executable by a processor to perform a method comprising:
receiving, using the processor, a search term;
identifying, using the processor, a format of the search term;
based on the identified format of the search term, identifying, in each of a plurality of contact records, a first field and at least a second field, each of the first field and the second field having a respective format matching the identified format of the search term;
performing, using the processor, an arbitration process to determine that the first field has higher relevance to the search term than the second field, performing the arbitration process comprising weighting the first field and the second field based on how recently or how frequently electronic messages have been received from contacts associated with the respective fields, assigning to the first field a first value derived from the weighting, and assigning to the second field a second value derived from the weighting;
responsive to determining that the first field has higher relevance to the search term than the second field, searching, using the processor, the first field to identify at least a first of the plurality of contact records that at least partially matches the search term;
presenting to a user, using the processor, at least a portion of at least the first of the plurality of contact records that at least partially matches the search term; and
responsive to receiving a user input selecting the first of the plurality of contact records that at least partially matches the search term, identifying, using the processor, at least one e-mail for which the first field and at least the second field at least partially match data in the e-mail.

12. The computer program product of claim 11, wherein identifying the format of the search term comprises parsing the search term to identify the format.

13. The computer program product of claim 11, wherein determining that the first field has higher relevance to the search term than the second field comprises:
determining that the first value is greater than the second value.

14. The computer program product of claim 11, the method further comprising:
receiving a user input selecting a second field of the plurality of records to search;
searching the second field to identify at least a second of the plurality of records that at least partially matches the search term; and
presenting to the user at least a portion of at least the second of the plurality of records that at least partially matches the search term.

15. The computer program product of claim 11, wherein identifying the at least one e-mail corresponding to the first of the plurality of records comprises:
determining the at least one e-mail satisfies a particular time criteria for when the e-mail was sent or received.

\* \* \* \* \*